D. Philips,
Circular Saw Mill.

Nº 6,580. Patented July 3, 1849.

UNITED STATES PATENT OFFICE.

DAVID PHILIPS, OF PITTSBURGH, PENNSYLVANIA.

CIRCULAR-SAW MILL.

Specification of Letters Patent No. 6,580, dated July 3, 1849.

*To all whom it may concern:*

Be it known that I, DAVID PHILIPS, of Pittsburgh, in the county of Allegheny and State of Pennsylvania, have invented a certain new and Improved Mode of Construction and Hanging Circular Saws, of which the following is a full and exact description, reference being had to the annexed drawings of the same, making part of this specification, in which—

Figure 4:
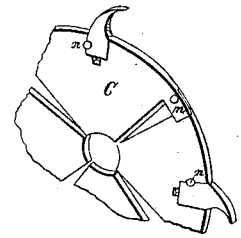
Figure 2:
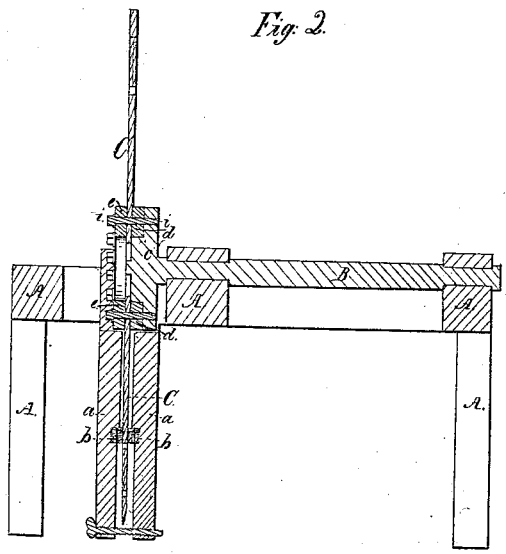
Figure 3:
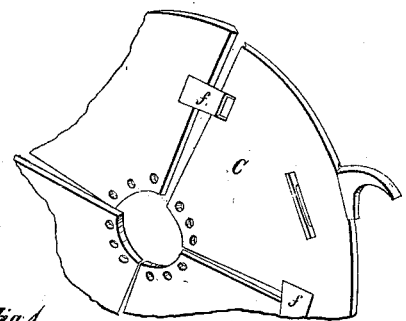
Figure 1:
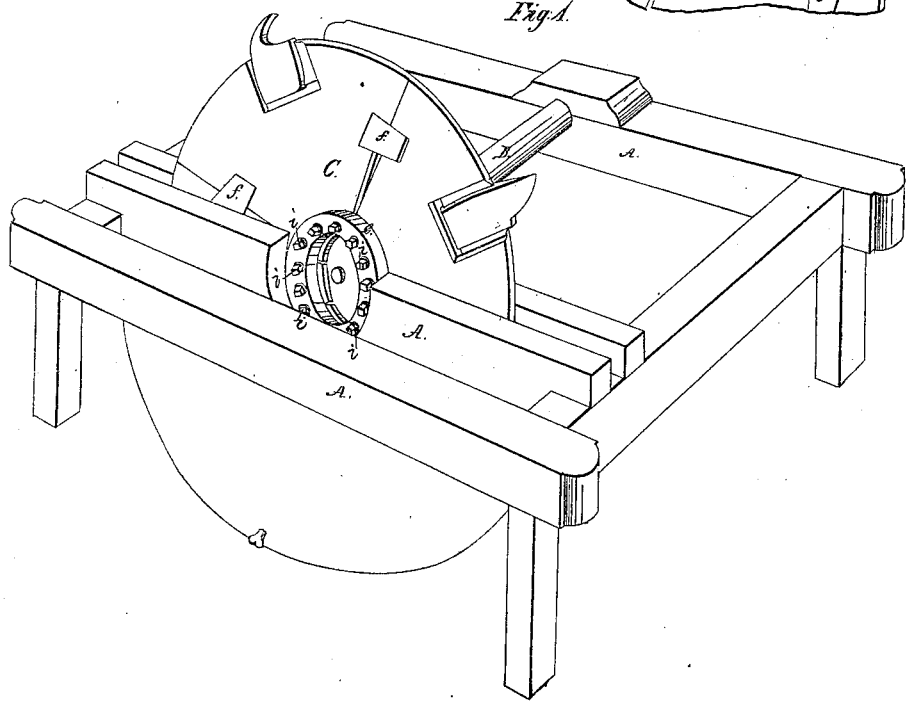

Figure 1 is a perspective view of a saw mounted in a frame, and ready for operation, Fig. 2 is a vertical section taken in a plane parallel to the shafts, Fig. 3 is a section of the saw detached, showing one of the segments partially separated from the rest, Fig 4 is a section of the saw plate detached showing another mode of joining the segments by means of lap joints and soft metal rivets.

The same letters indicate the same parts in all the figures.

In the accompanying drawings A is the frame on which the shaft B which carries the saw is mounted, in suitable bearings. The saw C is mounted upon one end of the shaft, its lower side hanging between two boards or plates *a a* whose inner sides are armed with curved brushes or cushions *h* which are capable of being pressed with more or less force against the plate of the saw by means of an adjusting screw; the object of the brush or cushion thus arranged is to destroy the vibrations induced in the plate by the action of the tooth against the wood in passing through the kerf.

It is plain that unyielding guides for the saw plate to pass between, as friction rollers, or fixed blocks of wood or metal, would be inadequate to the purpose because of the inequalities always found in sheets of iron of which the saw plates are most commonly made, which irregularities would sometimes cause the plate to bind between and at other times not to touch the guides at all or only on one side, which action would unavoidably have the effect of augmenting rather than repressing vibrations in the plate, and will besides render necessary a great increase in the power required to turn the saw.

The end of the shaft has a disk or head *c* secured upon it in any suitable manner, which is turned perfectly true and concentric with the shaft. On the outer side of this head a rabbet is formed to receive the ring *d* which is accurately fitted upon it. The saw plate C consists of three or more segments, the joints between which are sufficiently wide to admit of the free expansion of the metal by heat, without bringing them into contact, by which means buckling of the plate is effectually prevented. The several segments forming the plate are held together by two rings *d e* between which they are placed, and screw bolts passed through the whole, and I prefer two bolts through each segment, because they enable me to set the saw true more easily than when only one bolt is used in truing the saw, if any part of the periphery bends too much to one side, one or more thicknesses of paper is placed between the plate and the ring in the radius of the bulge or projection, and on the side of the convexity, the screws are then tightened on each side of the paper which will bend the plate to any extent required for adjustment. When the segments have been thus bound together, the inner ring *d* is placed upon the projecting part of the head, and one bolt *i* passed through each segment to secure the whole to the head, and if it should be necessary to the adjustment of the saw in a truly vertical plane at right angles to the shaft, to place papers or thin laminæ of metal between the ring and the head, it can be done at the discretion of the constructor.

In order that the several segments of the saw may afford mutual support to each other they are interlocked near to their periphery by means of an angular groove in one, into which a tongue is inserted which is formed on the other. The segments are further connected by a key *f* which is attached firmly to one, and projects into a recess in the other, this recess being inclined to the radius and inclining outward to facilitate the separation of the segments.

The sides of the recesses are in the form of a blunt wedge, and enter corresponding grooves formed in the keys *f*. These keys and the tongues and grooves in the radial joints prevent any independent lateral vibration or bending of any one of the segments, and renders the whole more firm and rigid. The teeth in Figs. 1, 2 and 3 are secured upon the plate by means of a sliding dovetail joint as described in a former patent granted to me.

In Fig. 4 another method of connecting the segments and of affixing the teeth to them, is shown. The segments are fastened together by two projecting pieces *m* which are each reduced to half the thickness of the plate, and a rivet of tin, brass, copper, or other soft metal passed through them which would either bend or break by a force less than would break the laps; and when the segments are required to be separated, these soft rivets can be punched out without defacing or injuring the holes, and either inserted again, or replaced by others. The teeth in these segments are inserted into radial recesses in the periphery of the plates, the sides of which recesses have a V tongue formed on them which enters a corresponding groove formed in the edges of the teeth, the tongue and groove being well fitted together so as to hold the teeth firmly in place. The teeth are prevented from being thrown out by centrifugal force, by means of a rivet *n* of soft metal similar to those described as securing the lap joints.

I do not claim making the saw plate in sections placed close together and attached to the periphery of a head or collar as that has heretofore been done in saws for veneers and other analogous purposes, but 1. What I do claim as my invention, and for which I solicit Letters Patent is making the plate of the saws in sections whose inner angle rests upon the shaft and is secured to the rings and collar, substantially in the manner described, the radial edges of adjacent sections being separated from each other far enough to admit of the free expansion of the metal from heat without meeting but connected by means which do not prevent their expansion; whereby the warping or buckling which invariably occurs in solid plates or those whose sections are in contact, from partial heating, is effectually prevented, while at the same time the compound sectional plate thus arranged possesses sufficient strength and firmness for all practical purposes.

2. I likewise claim the method herein described of preventing and arresting the vibrations in the saw plate by causing it to pass between cushions, bristles, or other elastic surfaces arranged as herein described or in any other substantially similar manner.

In testimony whereof I have hereunto signed my name this tenth day of January, 1849.

DAVID PHILIPS.

Witnesses:
 Wm. D. Washington,
 P. H. Watson.